United States Patent
Chang et al.

(10) Patent No.: US 12,526,714 B2
(45) Date of Patent: Jan. 13, 2026

(54) METHOD PERFORMED BY USER EQUIPMENT, AND USER EQUIPMENT

(71) Applicant: Sharp Kabushiki Kaisha, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 440 days.

(21) Appl. No.: 18/009,751

(22) PCT Filed: Jun. 7, 2021

(86) PCT No.: PCT/CN2021/098603
§ 371 (c)(1),
(2) Date: Dec. 12, 2022

(87) PCT Pub. No.: WO2021/254197
PCT Pub. Date: Dec. 23, 2021

(65) Prior Publication Data
US 2023/0262565 A1    Aug. 17, 2023

(30) Foreign Application Priority Data
Jun. 18, 2020  (CN) .......................... 202010562707.7

(51) Int. Cl.
*H04W 36/30*  (2009.01)
*H04W 36/00*  (2009.01)
*H04W 36/36*  (2009.01)

(52) U.S. Cl.
CPC ..... *H04W 36/305* (2018.08); *H04W 36/0072* (2013.01); *H04W 36/362* (2023.05)

(58) Field of Classification Search
None
See application file for complete search history.

(56) References Cited

U.S. PATENT DOCUMENTS

| | | | |
|---|---|---|---|
| 2022/0007246 A1* | 1/2022 | de Silva | H04W 36/305 |
| 2022/0338075 A1* | 10/2022 | Jung | H04W 48/12 |
| 2022/0386182 A1* | 12/2022 | Kim | H04W 36/087 |
| 2022/0386204 A1* | 12/2022 | Parichehrehteroujeni | H04W 36/18 |

(Continued)

OTHER PUBLICATIONS

Google Inc., "[G104] Clarification on DAPS handover failure while the T310 is running", 3GPP TSG-RAN WG2 Meeting #110-e, R2-2005529, Jun. 1-12, 2020, 6 pages.

(Continued)

*Primary Examiner* — Charles N Appiah
*Assistant Examiner* — Frank E Donado
(74) *Attorney, Agent, or Firm* — Keating & Bennett, LLP

(57) ABSTRACT

Provided in the present invention is a method performed by user equipment (UE), including: when the UE undergoes a dual active protocol stack (DAPS) handover failure during a DAPS handover, if no source base station radio link failure (RLF) is detected, the UE falling back to a source base station link, without generating and storing handover failure information for the DAPS handover failure in a link failure report; and if the UE, when falling back to the source base station link, detects a source base station RLF, the UE recording and storing link failure information for the source base station RLF in the link failure report.

2 Claims, 13 Drawing Sheets

(56) References Cited

U.S. PATENT DOCUMENTS

2023/0379773 A1* 11/2023 Jang .................... H04W 74/04

OTHER PUBLICATIONS

Qualcomm Incorporated, "RRM, RLM and RLF handling during LTE enhanced MBB HO", 3GPP TSG-RAN WG2 Meeting #106, R2-1906381, May 13-17, 2019, 6 pages.
Official Communication issued in International Patent Application No. PCT/CN2021/098603, mailed on Sep. 14, 2021.
"3rd Generation Partnership Project; Technical Specification Group Radio Access Network; NR; Radio Resource Control (RRC) protocol specification (Release 15)",3GPP TS 38.331, V15.9.0, Mar. 2020, 535 pages.
Ericsson, "Summary of AI 8.13.2.1—Handover related SON aspects", 3GPP TSG-RAN WG2 #112-e, R2-2010995, Nov. 2-13, 2020, 40 pages.
China Telecom, "Revised WID: Even further mobility enhancement in E-UTRAN", 3GPP TSG-RAN meeting #81, RP481544, Sep. 10-13, 2018, 4 pages.
Intel Corporation, "New WID: NR mobility enhancements", 3GPP TSG-RAN Meeting #80, RP-181433, May 21-25, 2018, 5 pages.

* cited by examiner

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and corresponding user equipment.

BACKGROUND

A new research project on 5G technical standards (see non-patent literature: RP-181433: New WID on NR (New Radio) mobility enhancements) and a new research project on Long Term Evolution (LTE) system Release 16 (see non-patent literature: RP-181544) were approved at the 3rd Generation Partnership Project (3GPP) RAN #80 plenary meeting in June 2018. One of the research objectives of the two research projects is to find solutions for meeting one of mobility requirements: seamless handover, namely, to reach handover interruption time of zero milliseconds or close to zero milliseconds in a handover procedure of changing a serving cell of UE. Among solutions under study to reduce the handover interruption time, there is a solution called Dual Active Protocol Stack (DAPS) mechanism. In the DAPS mechanism, after receiving a handover command, the UE does not cut off a link (data transmission) to a source base station in a handover procedure to access a target base station, but rather, the UE can maintain connection and data transmission to the target base station and the source base station at the same time, thereby avoiding a delay caused by service interruption due to disconnection to the source base station before accessing the target base station.

SUMMARY

In order to address at least part of the aforementioned issues, provided in the present invention are a method performed by user equipment and user equipment, which can effectively perform radio link failure reporting in a DAPS mechanism in an LTE/NR system.

According to the present invention, provided is a method performed by user equipment (UE), comprising: when the UE undergoes a dual active protocol stack (DAPS) handover failure during a DAPS handover, if no source base station radio link failure (RLF) is detected, the UE falling back to a source base station link, without generating and storing handover failure information for the DAPS handover failure in a link failure report; and if the UE, when falling back to the source base station link, detects a source base station RLF, the UE recording and storing link failure information for the source base station RLF in the link failure report.

Preferably, the falling back to a source base station link comprises: a source base station falling back to a used radio resource control (RRC) configuration, and resuming a suspended signaling radio bearer of a source cell.

Preferably, the link failure report further comprises: information indicating that the UE has just undergone the DAPS handover failure.

Preferably, the link failure report further comprises: a target cell identity of the DAPS handover, and/or information indicating failure of a random access procedure performed during the DAPS handover.

In addition, according to the present invention, provided is a method performed by user equipment (UE), comprising: when the UE undergoes a dual active protocol stack (DAPS) handover failure during a DAPS handover, if no source base station radio link failure (RLF) is detected, the UE falling back to a source base station link, and generating and storing handover failure information for the DAPS handover failure in a link failure report; and if the UE, when falling back to the source base station link, detects a source base station RLF, the UE recording and storing link failure information for the source base station RLF in the link failure report.

Preferably, the falling back to a source base station link comprises: a source base station falling back to a used radio resource control (RRC) configuration, and resuming a suspended signaling radio bearer of a source cell.

Preferably, the link failure report further comprises: information indicating that the source base station RLF has occurred when the UE falls back to the source base station link after the DAPS handover failure.

In addition, according to the present invention, provided is a method performed by user equipment (UE), comprising: the UE detecting a source base station radio link failure (RLF) during a dual active protocol stack (DAPS) handover; and if a DAPS handover failure occurs after the detection of the source base station RLF, the UE generating and storing handover failure information for the DAPS handover failure in a link failure report, wherein the link failure report further comprises link failure information for the source base station RLF.

Preferably, the link failure information for the source base station RLF comprises one or a plurality of the following: information indicating an elapsed time between reception of a DAPS handover command by the UE and the detection of the source base station RLF; information indicating a triggering cause of the source base station RLF; and information indicating that the source base station RLF has occurred during the DAPS handover.

In addition, according to the present invention, provided is user equipment, comprising: a processor; and a memory storing instructions, wherein the instructions, when run by the processor, perform the aforementioned method.

According to the present invention, radio link failure reporting in a DAPS mechanism in an LTE/NR system can be effectively performed. Specifically, when a source cell radio link failure (RLF) and/or a target cell RLF or DAPS HandOver Failure (HOF) occurs during a DAPS handover procedure performed by UE in an LTE/NR system, information related to the failure can be effectively recorded or reported.

BRIEF DESCRIPTION OF THE DRAWINGS

In order for those skilled in the art to fully understand the present invention and advantages thereof, the following description is provided in conjunction with the accompanying drawings.

DETAILED DESCRIPTION

Figure 1:
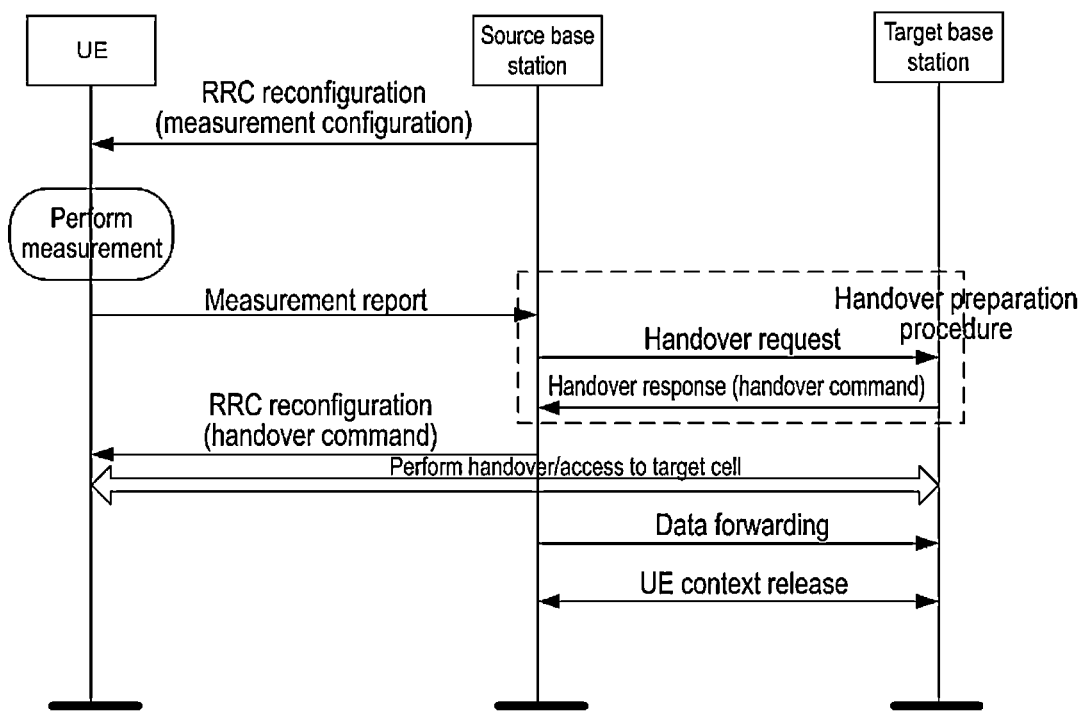
FIG. 1 is a schematic diagram identifying a general handover procedure.

According to the following detailed description of exemplary embodiments of the present invention made in conjunction with the accompanying drawings, other aspects, advantages, and prominent features of the present invention will become apparent to those skilled in the art. In the drawings, identical or similar structures are marked by identical or similar reference numerals.

In the present invention, the terms "include" and "comprise" and derivatives thereof mean inclusion without limitation; the term "or" has an inclusive meaning and means "and/or."

In the present specification, the following various embodiments for describing the principles of the present invention are merely illustrative, and should not be interpreted in any way as limiting the scope of the disclosure. The following description, which references the accompanying drawings, is used to facilitate full understanding of the exemplary embodiments of the present invention as defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present invention. In addition, the description of the known function and structure is omitted for clarity and simplicity. In addition, the same reference numerals are used for similar functions and operations throughout the accompanying drawings.

A plurality of embodiments according to the present invention are specifically described below by using a Long Term Evolution (LTE)/NR mobile communication system and subsequent evolved versions thereof as an exemplary application environment. However, it is to be noted that the present invention is not limited to the following implementations, but may be applied to other wireless communications systems. In the present invention, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present invention, a handover refers to change of a primary cell initiated by a network side, the change including inter-cell change of the primary cell and intra-cell change of the primary cell. That is, a primary cell of UE is changed from a source cell to a target cell, where the source cell and the target cell may be the same cell or different cells. In this procedure, a key or a security algorithm for access layer security may also be accordingly updated. The security includes encryption and decryption and integrity protection. The source cell may also be referred to as a source base station, or a source beam, a source transmission point (TRP), a source primary cell (PCell), or a source master cell group (MCG); the target cell may also be referred to as a target base station, or a target beam, a target transmission point, a target primary cell (PCell), or a target master cell group (MCG). The source cell refers to a connected cell serving the UE before a handover procedure is initiated, namely, a cell transmitting to the UE an RRC message including a handover command. The target cell refers to a cell connected to and serving the UE after the handover procedure is successfully completed, or a cell indicated by a target cell identity included in the handover command, or a cell that performs downlink synchronization and random access in the handover procedure. The handover command described in the present invention is used to trigger the UE to execute a handover. In an NR system, the handover command is an RRC reconfiguration message including a synchronized reconfiguration (Reconfigurationwithsync) information element. Further, the handover command is an RRC reconfiguration message including a synchronized reconfiguration (Reconfigurationwithsync) information element for a master cell group (MCG). In this case, the handover may also be referred to as an MCG synchronized reconfiguration. In an LTE system, the handover command is an RRC connection reconfiguration message including a mobility control information (MobilityControlInfo) information element. The synchronized reconfiguration information element or the mobility control information information element may include configuration information of the target cell, for example, a target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present invention, the RRC reconfiguration message is equivalent to the RRC connection reconfiguration message; similarly, an RRC reconfiguration complete message serving as a response message thereto is equivalent to an RRC connection reconfiguration complete message. The handover command is equivalent to the RRC message including the handover command, and refers to an RRC message or a configuration in the RRC message triggering the UE to execute a handover. The handover configuration refers to all of or part of configurations in the handover command "Cancel", "release", "delete", "flush", and "clear" are interchangeable. "Execute", "use", and "apply" are interchangeable. "Configure" and "reconfigure" are interchangeable. "Monitor" and "detect" are interchangeable. An RRC re-establishment message is equivalent to an RRC connection re-establishment message; similarly, an RRC re-establishment complete message serving as a response message thereto is equivalent to an RRC connection re-establishment complete message.

The following describes processes or concepts in the prior art to which the present invention relates.

Handover Configuration in NR Systems:

In an NR system, an RRC reconfiguration message for a handover command carries RRC configurations from a target base station, including but not limited to the following RRC configurations (see Section 6.2.2 of 3GPP Technical Standard Protocol 38.331 for details):

A measurement configuration (measconfig information element): used to configure intra-frequency, inter-frequency, and inter-radio access technology measurements performed by UE, for example, a measurement object configuration, a measurement report configuration, a measurement gap configuration, etc.

A cell group configuration (cellGroupConfig information element), used to configure a master cell group or a secondary cell group, including a Radio Link Control (RLC) bearer configuration (rlc-bearerToAddModList information element and rlc-bearerToreleaselist information element), a Medium Access Control (MAC) configuration (MAC-cellgroupconfig information element), a physical layer configuration, a secondary cell addition/modification/release configuration, a special cell (SpCell) configuration, etc. corresponding to a data radio bearer/signaling radio bearer. The sPCell configuration includes a cell index number, handover information (reconfigurationWithSync information element), a radio link failure related timer and constant configuration, a Radio Link Monitoring (RLM) configuration, a special cell dedicated configuration, etc. The reconfigurationwithsync information element is similar to the mobility control information in the LTE system and includes handover related information to implement mobility, and the information element includes serving cell configuration common information, a C-RNTI of the UE in the target cell, configurations of a handover procedure monitoring timer T304, a random access dedicated configuration for a random access procedure to the target cell.

Non-access stratum dedicated information (dedicatedInfoNASList information element).

A radio bearer configuration (radiobearerConfig information element), used to configure a Service Data Application Protocol layer (SDAP) and a PDCP of a radio bearer DRB and/or an SRB.

A master key update configuration (masterKeyupdate information element).

A general handover procedure in LTE/NR systems is described below. See FIG. 1 for details.

User mobility in a connected state is implemented mainly by means of a handover procedure, and the handover refers to a procedure in which UE in an RRC connected state changes a serving cell (primary cell). The handover procedure generally includes the following phases:

Phase 1, a measurement phase. A base station issues a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as load of the base station, whether to trigger a handover for the UE. If it is determined to trigger a handover for the UE, then a source base station initiates a handover preparation procedure by transmitting a handover request message to a target base station. The target base station determines, according to the context of the UE in the handover request message, available resources of the target base station, and other factors, whether to accept this handover request of the UE. If so, then the target base station replies to the source base station with a handover acknowledgment message, wherein the handover acknowledgment message includes an inter-node RRC message, namely, a handover command.

Phase 3, a handover execution phase. The source base station issues the handover command to the UE, and starts to forward data of the UE to the target base station. UE receiving the handover command immediately uses a configuration in the handover command to execute a handover, accesses the target base station by means of a random access procedure, and transmits an acknowledgment message to the target base station. The random access procedure is not mandatory.

Phase 4, a handover completion phase. After confirming that the UE successfully accesses the target base station, the target base station transmits a handover complete message to the source base station. According to the handover complete message, the source base station may release the UE context stored thereon.

Dual Active Protocol Stack (DAPS) Handover:

The DAPS handover introduced in Release 16 refers to a handover procedure in which UE, after receiving an RRC message for handover, still maintains a connection to a source base station until the source base station is released after a random access procedure for a target base station is successfully performed. In this procedure, for a bearer configured with DAPS, the UE continues receiving downlink data from the source base station until the source base station is released, and the user continues transmitting uplink data to the source base station until the random access procedure to the target base station is successfully completed. After the random access procedure to the target base station is completed, a MAC layer indicates to an upper layer that the random access procedure is completed, and after receiving the indication, an RRC layer instructs a lower layer (e.g., a Packet Data Convergence Protocol (PDCP) layer) to perform an uplink data switch, so as to switch an uplink path from the source base station to the target base station. When the PDCP layer is requested to perform the uplink data switch, the PDCP layer submits a PDCP data protocol data unit (PDU) to an RLC entity associated with the target base station, submits a PDCP control PDU associated with the source base station to an RLC entity associated with the source base station, and submits a PDCP control PDU associated with the target base station to an RLC entity associated with the target base station.

Figure 2:
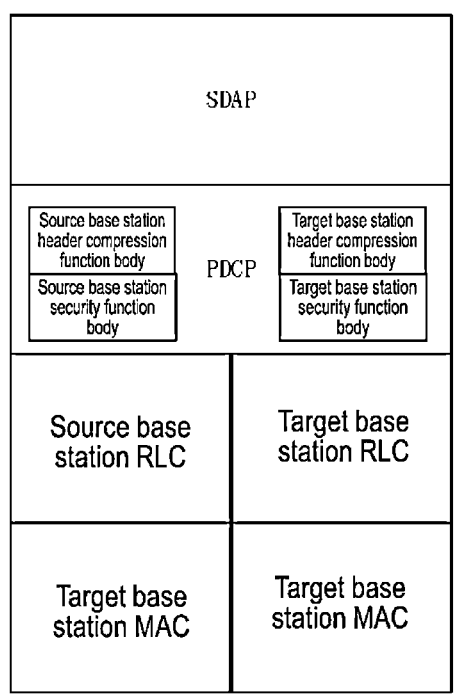
FIG. 2 is a schematic diagram showing a user plane protocol stack in a dual active protocol stack configuration.

In the case of the DAPS handover, after receiving a handover command, the UE establishes a MAC entity for the target base station. If a DRB is configured as a DAPS bearer, the UE establishes for the DRB an RLC entity and a dedicated traffic logical channel (DTCH) associated with the target base station, reconfigures a PDCP entity associated with the DAPS bearer as a DAPS PDCP entity which is a PDCP entity that has security and robust header compression (ROHC) functions respectively associated with the source base station and the target base station, and respectively associates the security and ROHC functions with the corresponding RLC entities configured for the source base station and the target base station. In the above manner, in the DAPS handover procedure, the UE maintains active protocol stacks for the source base station and the target base station at the same time, as shown in FIG. 2.

In the DAPS procedure, if a radio link failure occurs at the source base station, the UE will suspend transmission of all DRBs of the source base station, reset the MAC entity, and release the connection to the source base station. When the DAPS handover succeeds, the UE receives an RRC reconfiguration message transmitted from the target base station, which carries instruction information (e.g., identified by a daps-SourceRelease information element) used to instruct release of the source base station. After receiving the instruction, the UE performs an operation of releasing a source base station configuration and protocol stack, and falls back to a single active protocol stack state in which only the connection to the target base station is maintained.

When the DAPS handover fails, that is, a T304 timer used to monitor the handover procedure expires, then if no radio link failure is detected at the source base station, the UE returns to the connection to the source base station, and informs the source base station that the DAPS handover failure has occurred, instead of triggering an RRC connection re-establishment procedure. In the process of returning to the connection to the source base station, the UE falls back from the DAPS state to a single active protocol stack state in which only communication with the source base station is maintained. If an RLF is also detected in the source base station or it is in an RLF state when the DAPS handover fails, then the UE triggers an RRC connection re-establishment procedure to perform link recovery.

In the following embodiments, the DAPS handover may be replaced with a handover procedure in which any DRB is configured to be a DAPS bearer.

Radio Link Failure (RLF):

The UE considers that an RLF has occurred when one of the following conditions occurs: a timer T310 used for RLF monitoring expires, a timer T312 used for fast RLF monitoring expires, an indication of a random access problem is received from a MAC layer, and an indication used to indicate that the maximum number of retransmissions has been reached is received from an RLC entity. During the DAPS handover, if the above timers, MAC entity, and RLC are associated with the source base station MCG, it is considered that a source base station MCG RLF (a source base station RLF for short) has been detected; if the above timers, MAC entity, and RLC are associated with the target base station MCG, it is considered that a target base station MCG RLF has been detected. In the case of single connectivity or dual connectivity, if the above timers, MAC entity, and RLC are associated with the MCG, it is considered that an MCG RLF is detected. In dual connectivity (DC), the UE is configured with a secondary cell group (SCG). If the above timers, MAC entity, and RLC are associated with the SCG, it is considered that an SCG RLF has been detected.

HandOver Failure:

The determination of a handover failure is achieved via a running status of the timer T304. When the UE initiates a handover procedure and starts performing a handover to the target base station, the timer T304 is started. When the handover procedure succeeds, the timer T304 is stopped. That the handover procedure succeeds means that an RRC message, such as an RRC reconfiguration complete message, for responding to a handover command has been successfully transmitted, or a random access procedure to the target base station has been successfully completed in the MAC layer of the UE. If T304 expires, then the UE considers that the handover has failed and the HOF has occurred, and subsequently the UE recovers the RRC connection by performing RRC re-establishment, or by falling back to the connection to the source base station when the DAPS configuration is present. In the following, if not otherwise specified, the link failure may refer to an RLF or HOF, and is also known as a connection failure.

Radio Link Failure Reporting Function in the Existing Mechanism:

In a current LTE system and an NR system of Release 16, UE will generate and store a radio link failure report (RLF report) when a link failure occurs, for example, a UE variable used to store the radio link failure report is VarRLF-Report. After connection to a network side (e.g., through an RRC re-establishment procedure or an RRC establishment procedure) is recovered, the UE can inform the network side by using an RRC message that there is an available radio link failure report thereon (for example, indicated by an rlf-InfoAvailable information element). For example, the UE can inform the network side that the UE has a stored available radio link failure report by means of an RRC re-establishment complete message (RRCReestablishment-Complete) in an RRC connection re-establishment procedure, an RRC reconfiguration complete message (RRCReconfigurationComplete) in an RRC reconfiguration procedure, an RRC setup complete message (RRCSetupComplete) in an RRC connection setup procedure, or an RRC resume complete message (RRCResumeComplete) in an RRC connection resume procedure. After receiving the indication, the network side may request, by using an RRC message (for example, an rlf-ReportReq information element in a UEInformationRequest message to indicate the request), the UE to report the radio link failure report stored thereby. The UE will report the stored radio link failure report (the rlf-Report information element in the UEInformationResponse message) to the network side in a response RRC message. The radio link failure report obtained by the network side is used for network optimization, such as network coverage and mobility robustness optimization. The radio link failure report may include: measurement results of a source cell and neighbor cell(s) available when a link fails, location information, the identity of a primary cell where the link failure occurs, the type of the link failure (e.g., RLF or HOF), an RLF cause, an elapsed time between the link failure and radio link failure reporting (timeSinceFailure information element), an elapsed time between reception of a last handover command to perform a handover procedure and the link failure (referred to as a timeConnFailure information element), random access procedure information, etc. In addition, the report further includes cell identities for reconnecting to the network after a failure, such as an RRC re-establishment cell identity, an RRC connection setup cell identity, etc. The random access procedure information is recorded in the link failure report when the cause of the link failure is a random access failure or the link failure is a handover failure. In general, the random access procedure information includes: a random access purpose or scenario, frequency domain start information of message 1 (an offset between the lowest position of a physical random access channel (PRACH) transmission occasion in the frequency domain and physical resource block 0 of an uplink bandwidth part), a subcarrier spacing of a PRACH resource, and detailed information about each random access attempt in the random access procedure. The detailed information about each random access attempt further includes: a used synchronization signal/physical broadcast channel block index value or channel state information reference signal index value, the number of random access preambles transmitted on a beam corresponding to the index value, and whether a contention is detected in each random access attempt and whether measured signal quality (Reference Signal Received Power, RSRP) is greater than a configured threshold. In the present invention, the link failure report, the radio link failure report, VarRLF-Report, and connection failure information are interchangeable. The existing mechanism allows the UE to store only one link failure report. That is, when another link failure occurs, the UE clears the stored link failure information (e.g., information in the variable VarRLF-report) related to the previous link failure, and records only link failure information related to the most recent link failure. The reason is that in existing networks, consecutive link failures do not usually occur, and between two link failures, the network side can always extract information of the previous link failure from the UE side.

The following link failure scenarios are considered in the present invention:

Scenario 1: Upon receiving the handover command including the DAPS configuration, the UE performs the DAPS handover procedure. The source base station RLF is detected before the DAPS succeeds (that is, T304 is in the running state), and subsequently the DAPS handover is successfully completed.

Scenario 2: Upon receiving the handover command including the DAPS configuration, the UE performs the DAPS handover procedure. Subsequently, the DAPS handover failure occurs when T304 expires. In this case, no link failure is detected on the source base station link, and the UE releases the target cell related configuration and protocol stack, falls back to the source base station, and transmits an RRC message (e.g., FailureInformation) including a DAPS failure indication to the source base station, but subsequently, a source base station link failure occurs. Briefly, in scenario 1, the UE undergoes the DAPS handover failure first, and subsequently undergoes the source cell link failure.

Scenario 3: Upon receiving the handover command including the DAPS configuration, the UE performs the DAPS handover procedure. The source base station RLF is detected before the DAPS succeeds (that is, T304 is in the running state), and subsequently the DAPS handover failure occurs when T304 expires. In this case, the UE initiates an RRC re-establishment procedure to perform link recovery. Briefly, in scenario 3, the UE undergoes the source base station link failure first, and subsequently undergoes the DAPS handover failure.

Scenario 4: Upon receiving the handover command including the DAPS configuration, the UE performs the DAPS handover procedure, and subsequently the DAPS handover failure occurs when T304 expires. In this case, no link failure is detected on the source base station link, and the UE then releases the target cell related configuration and protocol stack, successfully falls back to the source base station, and transmits an RRC message (e.g., FailureInformation) including a DAPS failure indication to the source base station.

Scenario 5: Upon receiving the handover command including the DAPS configuration, the UE performs the DAPS handover procedure. The source base station RLF is detected before the DAPS succeeds (that is, T304 is in the running state), and subsequently the DAPS handover is successfully completed. However, the target base station RLF occurs before long.

Scenario 6: Upon receiving the handover command including the DAPS configuration, the UE performs the DAPS handover procedure, and the DAPS handover succeeds. Before a source link release instruction from the base station is received, the source base station RLF is detected.

In existing mechanisms, if the source base station RLF occurs in the DAPS handover procedure, that is, when the T304 timer is in the running state, the UE does not record the link failure information corresponding thereto. That is, when said source base station RLF occurs, the UE does not generate or store the corresponding information in VarRLF-report. However, in the DAPS handover procedure, the source base station RLF failure information is also helpful for DAPS handover parameter optimization on the network side. This is because the purpose of the DAPS handover is to allow data transmission to the source base station and data transmission to the target base station to be both maintained in the handover procedure, thereby reducing data transmission latency, particularly for services having high delay requirements. Therefore, it is also very important to maintain normal operation of the source base station link in the DAPS handover procedure. Therefore, how to record the source base station RLF information in the DAPS handover procedure is an issue of concern in the present invention. Further, in the aforementioned scenarios, such as scenario 2 and scenario 3, the UE undergoes two link failures in succession. However, the existing mechanism only allows the UE to record the most recent link failure. As a result, the failure information of the previous link failure cannot be acquired by the network side. This is detrimental to DAPS handover parameter optimization, and is also an issue of concern in the present invention. The present invention provides solutions to the aforementioned issues via the following embodiments.

Embodiment 1

Figure 3:
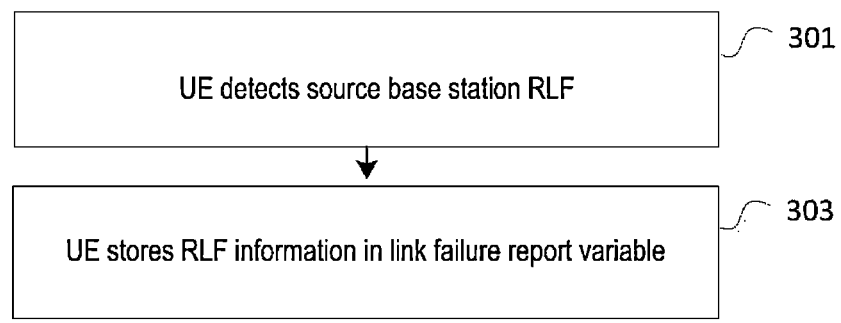
FIG. 3 is a flowchart showing a method performed by user equipment according to Embodiment 1 of the present invention.

FIG. 3 is a flowchart showing a method performed by user equipment according to Embodiment 1 of the present invention.

This embodiment provides a link failure information reporting method performed by UE during a DAPS handover. In this embodiment, when a source base station RLF in a DAPS handover procedure is detected, the UE generates and stores link failure information related to the source base station RLF. This embodiment is applicable to the aforementioned scenarios, such as scenarios 1, 6, etc., in which the source base station RLF occurs.

As shown in FIG. 3, in step 301, UE detects a source base station RLF.

As previously described, the UE may consider that the source base station RLF has occurred when one or a plurality of the following occur: a timer T310 or T312 associated with a source base station and used to determine a radio link failure expires; an indication of a random access problem is received from a source base station MAC entity; and an indication used to indicate that the maximum number of retransmissions has been reached is received from a source base station RLF layer.

In step 303, the UE stores RLF information in a link failure report variable (e.g., VarRLF-Report). Step 303 may further include: the UE suspending all data radio bearers in the source base station, releasing a source base station connection, etc.

The storing the source base station RLF information in the link failure report includes one or a plurality of the following:
- clearing information included in the link failure report variable;
- setting a failedPCellId field to be a cell identity or a cell frequency, a tracking area code, etc. of a source primary cell where an RLF is detected;
- setting a previousPCellId field to be a cell identity and a tracking area code of a source primary cell that has received a handover command;
- setting a timeConnFailure field to be an elapsed time between reception of the handover command and the detection of the link failure;
- setting a connection failure type connectionFailureType field to be a radio link failure;
- setting a c-RNTI field to be a Cell Radio Network Temporary Identifier (C-RNTI) used by the source primary cell;
- setting a link failure cause field rlf-cause to be a triggering cause of a radio link failure;
- including a field for indicating that the RLF is a source base station link RLF that occurs in a DAPS handover procedure. In the DAPS handover procedure, T304 is in the running state when the UE configured with any DAPS bearer performs the handover procedure, or the source base station configuration and protocol stack have not been released yet after the DAPS handover succeeds and T304 stops. That the handover succeeds means that the random access procedure triggered by the handover has been successfully completed in the MAC layer. That the source base station configuration and protocol stack have not been released yet means that the UE has not received any RRC message for releasing the source base station. In a configuration, the field is set to "1" or "TRUE".
- including a field for indicating the target cell identity of the DAPS handover. The target cell identity may be a global cell identifier or a tracking area identity, a physical cell identity, a carrier frequency, etc. Preferably, the field may also be used to indicate that the present link failure is a source base station RLF that occurs during the DAPS handover.
- including a field for indicating whether the link failure occurs in a DAPS handover procedure in which a connection to the target base station has not been successfully established yet (that is, T304 is running) or in a DAPS handover procedure in which a connection to the target base station has been successfully established but a source base station link release instruction has not been received. That is, the field is for indicating whether the link failure occurs during running of T304.

Preferably, when T304 is running in step 301, that is, when the UE is in the DAPS handover procedure but has not been successfully connected to the target base station yet, step 303 is performed.

Obviously, before step 301, the method further includes: the UE receiving the handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 2

Figure 4:
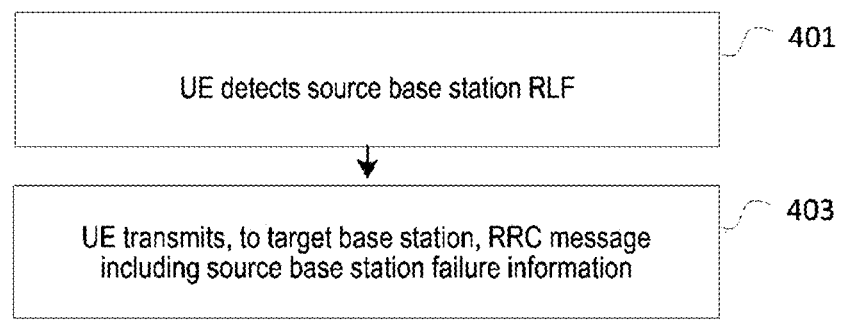
FIG. 4 is a flowchart showing a method performed by user equipment according to Embodiment 2 of the present invention.

FIG. 4 is a flowchart showing a method performed by user equipment according to Embodiment 2 of the present invention.

This embodiment provides a link failure information reporting method performed by UE during a DAPS handover. In this embodiment, when a source base station RLF in a DAPS handover procedure is detected, similar to the existing mechanism, the UE does not generate and store source base station RLF related link failure information, but directly includes the related failure information in an RRC message and indicates the same to a target base station. This embodiment is applicable to the aforementioned scenarios, such as scenarios 1, 6, etc., in which the source base station RLF occurs.

As shown in FIG. 4, in step 401, UE detects a source base station RLF.

As previously described, the UE may consider that the source base station RLF has occurred when one or a plurality of the following occur: a timer T310 or T312 associated with a source base station and used to determine a radio link failure expires; an indication of a random access problem is received from a source base station MAC entity; and an indication used to indicate that the maximum number of retransmissions has been reached is received from a source base station RLF layer.

In step 403, the UE transmits to a target base station an RRC message including source base station failure information (RLF information).

The RRC message may be an RRC reconfiguration complete message, such as an RRC reconfiguration complete message for responding to a handover command or an RRC reconfiguration complete message for responding to an RRC reconfiguration message including a source base station release instruction, or another RRC message.

The source base station failure information includes one or a plurality of the following:
- setting a field, such as a timeConnFailure field, to be an elapsed time between reception of the handover command and the detection of the link failure;
- setting a link failure cause field rlf-cause to be a triggering cause of a radio link failure;
- including a field for indicating that the RLF is a source base station link RLF that occurs in a DAPS handover procedure. In the DAPS handover procedure, T304 is in the running state when the UE configured with any DAPS bearer performs the handover procedure, or the source base station configuration and protocol stack have not been released yet after the DAPS handover succeeds and T304 stops. That the handover succeeds means that the random access procedure triggered by the handover has been successfully completed in the MAC layer. That the source base station configuration and protocol stack have not been released yet means that the UE has not received any RRC message for releasing the source base station. In a configuration, the field is set to "TRUE" or "1", indicating that the source base station RLF has occurred during the DAPS handover procedure.

Preferably, when T304 is running in step 401, that is, when the UE is in the DAPS handover procedure but has not been successfully connected to the target base station yet, step 403 is performed.

Obviously, before step 401, the method further includes: the UE receiving the handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 3

This embodiment provides a link failure information reporting method performed by UE during a DAPS handover. In this embodiment, when a source base station RLF in a DAPS handover procedure is detected, the UE generates and stores source base station RLF related link failure information, and when a DAPS handover failure occurs, the UE also generates and stores handover failure related link failure information. However, the previous source base station RLF related link failure information is not cleared during the aforementioned generation and storage of the link failure information. That is, the UE is allowed to respectively store failure reports respectively corresponding to two consecutive link failures. This embodiment is applicable to the aforementioned scenarios, such as scenarios 2, 3, etc., in which the source base station RLF occurs.

Case 3.1

Figure 5:
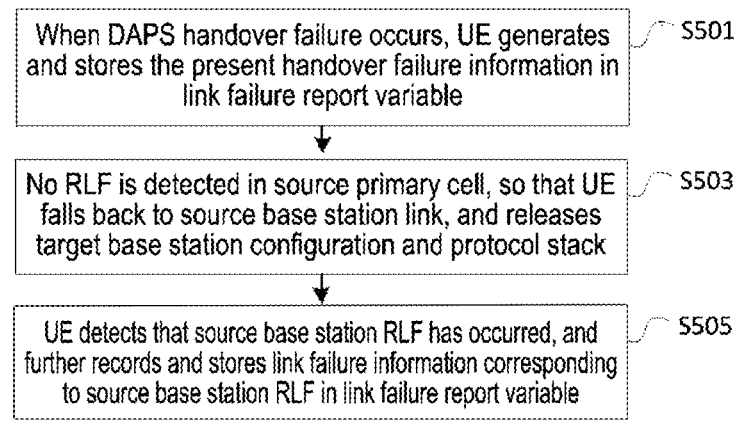
FIG. 5 is a flowchart showing a method performed by user equipment according to case 3.1 of Embodiment 3 of the present invention.

FIG. 5 is a flowchart showing a method performed by user equipment according to case 3.1 of Embodiment 3 of the present invention.

In a scenario in which a DAPS handover failure occurs first and then a source base station RLF occurs, the UE performs the following steps to record and store link failure information. The field settings via which the UE records and stores link failure information are the same as those in the existing mechanism, and will not be described herein again.

In step 501, when a DAPS handover failure occurs, that is, when T304 expires, the UE generates and stores the present handover failure information (denoted as first failure information) in a link failure report variable VarRLF-report. Preferably, a connection failure type field connectionFailureType in the link failure report is set to indicate that the type is a DAPS handover failure. Alternatively, the connection failure type field is set to handover failure hof.

In step 503, no RLF is detected in a source primary cell, so that the UE falls back to a source base station link, and releases a target base station configuration and protocol stack. The falling back to a source base station link includes falling back to an RRC configuration used by the source base station, and resuming a suspended signaling radio bearer of the source cell. The UE initiates transmission of a failure information message FailureInformation message to the source base station, so as to fall back to the source base station link and inform the source base station that the DAPS handover failure has occurred.

In step 505, the UE detects that a source base station RLF has occurred. For example, the transmission of the FailureInformation message is not successful due to, for example, the reaching of the maximum number of RLF retransmissions. In this case, the UE does not clear the information (denoted here as the first failure information) about the previous link failure stored in the link failure report variable VarRLF-report, but adds a new item to additionally record and store link failure information (denoted here as second failure information) corresponding to the source base station RLF. That is, after the RLF has occurred, if the UE, before the failure, has just undergone the DAPS handover failure, the UE does not clear the first failure information stored in the link failure report variable VarRLF-report, but adds a new item to additionally record and store the second failure information corresponding to the present RLF. The UE, before the failure, has just undergone a DAPS handover failure. In an implementation configuration, the UE determines, according to the stored first failure information, that the UE, before the failure, has just undergone a DAPS handover failure. For example, if the first failure information recording the DAPS handover failure is stored on the UE, or if in the stored first link failure information, it is determined that a connection failure type is HOF or DAPS HOF, the failedPCellId field is the cell identity of the target primary cell of the previous DAPS handover, the previousPCellId field is a cell identity of a current serving cell, or the value of the timeConnFailure field is less than a certain constant, etc., or the reestablishmentCellId is not included in the first failure information, then the UE determines that a DAPS handover failure has just occurred before the failure. Alternatively, the UE may also determine, according to whether the failure information message FailureInformation message has been transmitted, that the UE has just undergone the DAPS handover failure before the failure. If the UE has transmitted the failure information message FailureInformation message (within a recent period before the detection of the link failure), the UE considers that the DAPS handover failure has just occurred.

That is, the first failure information stored in the link failure report variable VarRLF-report is cleared when the UE determines that no DAPS handover failure has occurred before the present link failure.

Case 3.2

Figure 6:
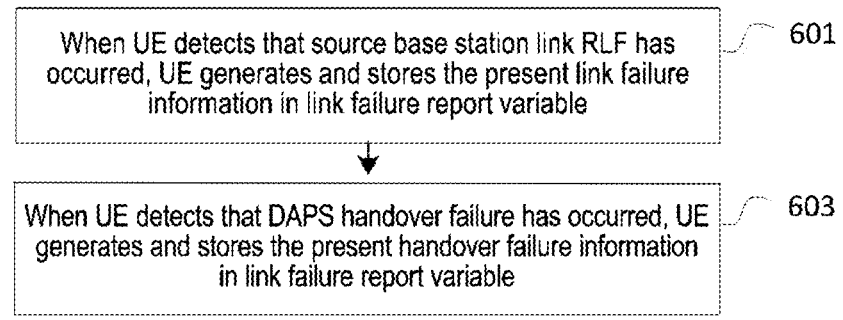
FIG. 6 is a flowchart showing a method performed by user equipment according to case 3.2 of Embodiment 3 of the present invention.

FIG. 6 is a flowchart showing a method performed by user equipment according to case 3.2 of Embodiment 3 of the present invention.

In a scenario in which a source base station RLF occurs first and then a DAPS handover failure occurs, the UE performs the following steps to record and store link failure information. The field settings via which the UE records and stores link failure information are the same as those in the existing mechanism, and will not be described herein again.

In step 601, when the UE detects that a source base station link RLF has occurred, the UE generates and stores the present link failure information (denoted here as first failure information) in a link failure report variable VarRLF-report. Preferably, the link failure information includes a field for indicating that the RLF is a source base station link RLF that occurs in a DAPS handover procedure. Preferably, in the DAPS handover procedure, T304 is in the running state when the UE configured with any DAPS bearer performs the handover procedure.

In step 603, when the UE detects that a DAPS handover failure has occurred, that is, when T304 expires, the UE generates and stores the present handover failure information in the link failure report variable VarRLF-report. In this case, the UE does not clear the first failure stored in the link failure report variable VarRLF-report, but adds a new item to additionally record and store link failure information (denoted here as second failure information) corresponding to the DAPS handover failure. That is, after the DAPS handover failure has occurred, if the UE, before the failure, has just undergone the source base station link failure RLF, the UE does not clear the first failure information stored in the link failure report variable VarRLF-report, but adds a new item to additionally record and store the second failure information corresponding to the present DAPS handover failure. The UE has just undergone the source base station RLF before the DAPS handover failure. In an implementation configuration, the UE determines, according to the stored first failure information, that the source base station RLF has just occurred before the DAPS handover failure. For example, if a related field in the stored first link failure information indicates that the failedPCellId field is the cell identity of the source primary cell of the present DAPS handover, or the previousPCellId field is the cell identity of the source primary cell, or the reestablishmentCellId is not included in the first failure information, then the UE determines that a source base station RLF has just occurred before the failure. Alternatively, the UE may determine that the source base station RLF has occurred by directly determining the current source base station link state, i.e., determining that the source base station RLF has just occurred before the DAPS handover failure if the source base station has detected the RLF.

That is, the first failure information stored in the link failure report variable VarRLF-report is cleared when the UE determines that no source base station RLF has occurred before the present link failure.

Obviously, before step 501 or step 601, the method further includes: the UE receiving a handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Optionally, in the above two cases, after undergoing the link failure, the UE triggers RRC connection re-establishment to recover the link to the network side. During the RRC re-establishment, if a cell for re-establishment is selected, then the UE includes a field for indicating the identity of the cell for re-establishment in the first failure information or the second failure information. Alternatively, the UE includes the field for indicating the cell for re-establishment in both the first failure information and the second failure information. Optionally, the UE includes the field for indicating the cell for re-establishment only in the failure information corresponding to the most recent link failure, i.e., the second failure information.

Embodiment 4

Figure 7:
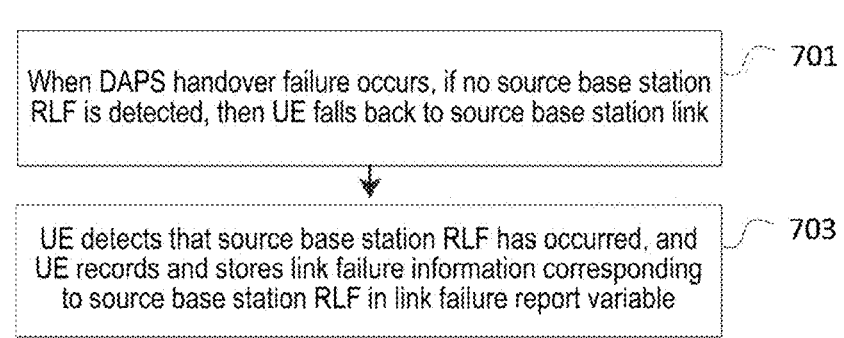
FIG. 7 is a flowchart showing a method performed by user equipment according to Embodiment 4 of the present invention.

FIG. 7 is a flowchart showing a method performed by user equipment according to Embodiment 4 of the present invention.

This embodiment provides a link failure information reporting method performed by UE during a DAPS handover. In this embodiment, the criteria of the existing mechanism are followed, and the UE is not allowed to respectively store two failure reports corresponding to two consecutive link failures. However, if consecutive link failures occur during the DAPS handover, then the UE includes some failure information of the previous DAPS handover failure in the most recent RLF report in addition to recording failure information corresponding to the present RLF according to the existing mechanism. This embodiment is applicable to scenario 2.

In a scenario in which a DAPS handover failure occurs first and then a source base station RLF occurs, the UE performs the following steps to record and store link failure information. The field settings via which the UE records and stores link failure information are the same as those in the existing mechanism, and will not be described herein again.

As shown in FIG. 7, in step 701, when a DAPS handover failure occurs, that is, when T304 expires, if no RLF is detected in a source primary cell, then the UE falls back to a source base station link. Optionally, in this case, the UE does not generate and store the present handover failure information (denoted as first failure information) in a link failure report variable VarRLF-report.

Specifically, no RLF is detected in the source primary cell, so that the UE falls back to the source base station link, and releases a target base station configuration and protocol stack. The falling back to a source base station link includes falling back to an RRC configuration used by the source base station, and resuming a suspended signaling radio bearer of the source cell. The UE initiates transmission of a failure information message FailureInformation message to the source base station so as to fall back to the source base station link and inform the source base station that the DAPS handover failure has occurred.

In step 703, the UE detects that a source base station RLF has occurred. For example, the transmission of the FailureInformation message is not successful due to, for example, the reaching of the maximum number of RLF retransmissions. The UE records and stores link failure information corresponding to the source base station RLF in the link failure report variable such as VarRLF-Report. Optionally, if the UE records the first failure information in step 701, then the UE clears the stored first failure information. Furthermore, the UE includes a field in a link failure information variable to indicate that the UE has just undergone a DAPS handover failure. Preferably, the UE includes the target cell identity of the DAPS handover in the link failure information variable. Optionally, information about a random access procedure performed in the DAPS handover procedure is further included. In this step, the name "source base station" is simply for better description of the method. Actually in step 701, the UE has released the configuration and protocol stack of the target base station of the DAPS handover, and has ended the handover state. Therefore, in step 703, the "source base station" may also be referred to as a serving base station, a current base station, a current MCG, or the like.

If the UE has just undergone the DAPS handover failure before the RLF, the operation of including the DAPS handover failure information in step 703 is performed. The UE may determine, according to whether the failure information message FailureInformation message has been transmitted, that the UE has just undergone the DAPS handover failure before the RLF. If the UE has transmitted the failure information message FailureInformation message (within a short period before the detection of the link failure), the UE considers that the DAPS handover failure has just occurred. Alternatively, if the UE has performed the DAPS handover and has undergone the DAPS handover failure (within a short period before the detection of the link failure RLF), then the UE considers that the DAPS handover failure has just occurred. Yet alternatively, the UE made a determination on the basis of the first failure information stored in step 701. For example, if the UE has the stored first failure information, or if the UE stores the first failure information in step 701, and if the first failure information indicates that the UE has undergone the DAPS handover failure, and if a previous primary cell identity previousPCellId field in the failure information indicates the identity related to the cell currently undergoing the RLF, then the UE considers that the DAPS handover failure has just occurred.

Optionally, the link failure report variable includes a field for indicating that the RLF occurs after the DAPS handover failure, or the RLF is a failure of falling back to the source base station link after the DAPS handover failure. Preferably, the field is a connection failure type field connectionFailureType.

Obviously, before step 701, the method further includes: the UE receiving a handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 5

Figure 8:
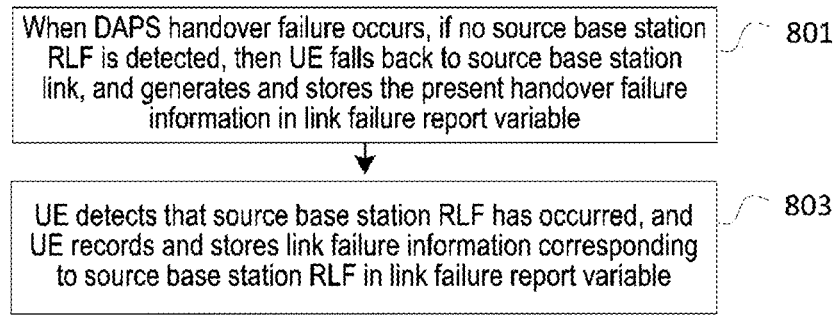
FIG. 8 is a flowchart showing a method performed by user equipment according to Embodiment 5 of the present invention.

FIG. 8 is a flowchart showing a method performed by user equipment according to Embodiment 5 of the present invention.

This embodiment provides a link failure information reporting method performed by UE during a DAPS handover. In this embodiment, the criteria of the existing mechanism are followed, and the UE is not allowed to respectively store two failure reports corresponding to two consecutive link failures. However, if consecutive link failures occur during the DAPS handover, then the UE does not generate a new RLF report (VarRLF-Report) for the most recent link failure, but adds related failure information of the present link failure RLF to the RLF report corresponding to the previous DAPS handover failure. This embodiment is applicable to scenario 2.

In a scenario in which a DAPS handover failure occurs first and then a source base station RLF occurs, the UE performs the following steps to record and store link failure information. The field settings via which the UE records and stores link failure information when the DAPS handover failure occurs are the same as those in the existing mechanism, and will not be described herein again.

As shown in FIG. 8, in step 801, when a DAPS handover failure occurs, that is, when T304 expires, if no RLF is detected in a source primary cell, then the UE falls back to a source base station link, and in this case, the UE generates and stores the present handover failure information (denoted as first handover failure information) in a link failure report variable VarRLF-report.

Specifically, no RLF is detected in the source primary cell, so that the UE falls back to the source base station link, and releases a target base station configuration and protocol stack. The falling back to a source base station link includes falling back to an RRC configuration used by the source base station, and resuming a suspended signaling radio bearer of the source cell. The UE initiates transmission of a failure information message FailureInformation message to the source base station so as to fall back to the source base station link and inform the source base station that the DAPS handover failure has occurred.

In step 803, the UE detects that a source base station RLF has occurred. For example, the transmission of the Failure-information message is not successful due to, for example, the reaching of the maximum number of RLF retransmissions. The UE records link failure information corresponding to the source base station RLF in the link failure report variable such as VarRLF-Report as follows: including a field for indicating that the RLF occurs when the UE falls back to the source base station link after the DAPS handover failure, or the fallback to the source base station link fails. Optionally, a field indicating primary cell and neighboring cell measurement results that are available when the RLF occurs is included. Optionally, a time field is further included and is used to indicate an elapsed time between the DAPS handover failure that the UE undergoes in step 801 and the RLF in step 803. Optionally, a field used to indicate a cause of the RLF is further included. In this step, when the RLF occurs, the UE does not clear the first failure information stored in the radio link failure report variable in step 801, but includes the aforementioned fields in addition to the first failure information stored in the radio link failure report. In this step, the name "source base station" is simply for better description of the method. Actually in step 801, the UE has released the configuration and protocol stack of the target base station of the DAPS handover, and has ended the handover state. Therefore, in step 803, the "source base station" may also be referred to as a serving base station, a current base station, a current MCG, or the like.

The link failure report variable is generated when the DAPS handover failure occurs in step 801, and includes relevant information of the DAPS handover failure, and is not the new link failure report item created in step 803.

Obviously, before step 801, the method further includes: the UE receiving a handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 6

Figure 9:
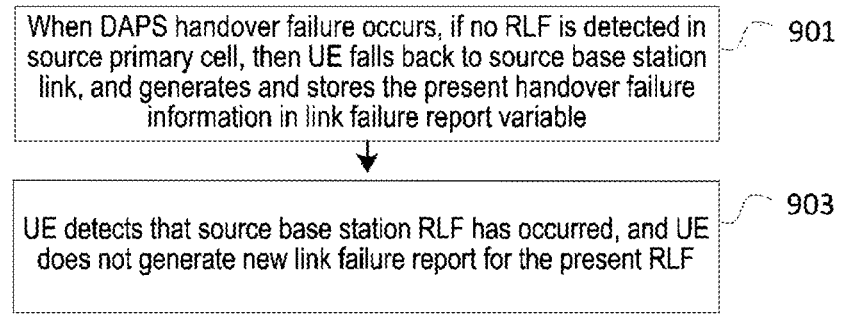
FIG. 9 is a flowchart showing a method performed by user equipment according to Embodiment 6 of the present invention.

FIG. 9 is a flowchart showing a method performed by user equipment according to Embodiment 6 of the present invention.

This embodiment provides a link failure information reporting method performed by UE during a DAPS handover. In this embodiment, the criteria of the existing mechanism are followed, and the UE is not allowed to separately store two failure reports corresponding to two consecutive link failures. However, if consecutive link failures occur during the DAPS handover, then the UE does not generate a new RLF report (VarRLF-Report) for the most recent link failure. This embodiment is applicable to scenario 2.

In a scenario in which a DAPS handover failure occurs first and then a source base station RLF occurs, the UE performs the following steps to record and store link failure information. The field settings via which the UE records and stores link failure information when the DAPS handover failure occurs are the same as those in the existing mechanism, and will not be described herein again.

As shown in FIG. 9, in step 901, when a DAPS handover failure occurs, that is, when T304 expires, if no RLF is detected in a source primary cell, then the UE falls back to a source base station link, and in this case, the UE generates and stores the present handover failure information in a link failure report variable VarRLF-report.

Specifically, no RLF is detected in the source primary cell, so that the UE falls back to the source base station link, and releases a target base station configuration and protocol stack. The falling back to a source base station link includes falling back to an RRC configuration used by the source base station, and resuming a suspended signaling radio bearer of the source cell. The UE initiates transmission of a failure information message FailureInformation message to the source base station so as to fall back to the source base station link and inform the source base station that the DAPS handover failure has occurred.

In step 903, the UE detects that a source base station RLF has occurred. For example, the transmission of the Failure-information message is not successful due to, for example, the reaching of the maximum number of RLF retransmissions. In this case (the RLF occurs when the UE falls back to the source base station link after the DAPS handover failure, or the fallback to the source base station link fails), the UE does not generate a new link failure report for the present RLF, and does not change or add information/fields in the stored link failure report variable such as VarRLF-Report.

Obviously, before step 901, the method further includes: the UE receiving a handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 7

Figure 10:
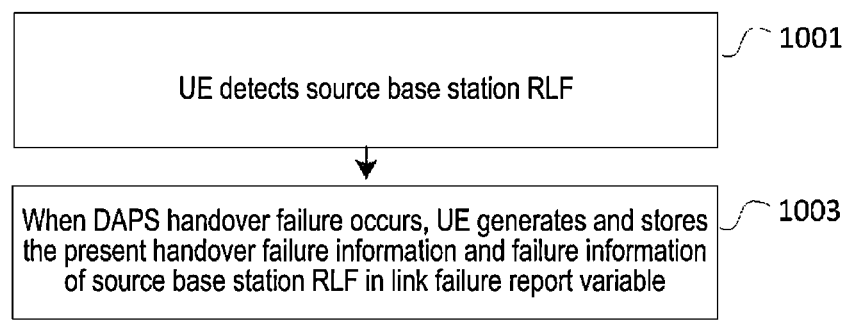
FIG. 10 is a flowchart showing a method performed by user equipment according to Embodiment 7 of the present invention.

FIG. 10 is a flowchart showing a method performed by user equipment according to Embodiment 7 of the present invention.

This embodiment provides a link failure information reporting method performed by UE during a DAPS handover. In this embodiment, the criteria of the existing mechanism are followed, and the UE is not allowed to separately store two failure reports corresponding to two consecutive link failures. However, if consecutive link failures occur during the DAPS handover, then the UE includes some failure information of the previous source base station RLF in the most recent RLF report in addition to recording the failure information corresponding to the present DAPS handover failure according to the existing mechanism. This embodiment is applicable to scenario 3.

In a scenario in which a source base station RLF occurs first and then a DAPS handover failure occurs, the UE performs the following steps to record and store link failure information. The field settings via which the UE records and stores link failure information are the same as those in the existing mechanism, and will not be described herein again.

As shown in FIG. 10, in step 1001, UE detects a source base station RLF.

As previously described, the UE may consider that the source base station RLF has occurred when one or a plurality of the following occur: a timer T310 or T312 associated with a source base station and used to determine a radio link failure expires; an indication of a random access problem is received from a source base station MAC entity; and an indication used to indicate that the maximum number of retransmissions has been reached is received from a source base station RLF layer.

In step 1003, when a DAPS handover failure occurs, that is, when T304 expires, the UE generates and stores the present handover failure information in a link failure report variable VarRLF-report. Additionally, the UE further includes, in the variable, the failure information of the source base station RLF in step 1001. The source base station failure information includes one or a plurality of the following:

setting a field to be an elapsed time between reception of a handover command and the detection of the source base station RLF;

setting another field to be a triggering cause of the source base station RLF;

including a field for indicating that the source base station link RLF has occurred in a DAPS handover procedure. In the DAPS handover procedure, T304 is in the running state when the UE configured with any DAPS bearer performs the handover procedure. In a configuration, the field is set to "TRUE" or "1", indicating that the source base station RLF has occurred during the DAPS handover procedure.

Obviously, before step 1001, the method further includes: the UE receiving the handover command including a DAPS configuration, and performing the handover procedure. The UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

In another implementation configuration, in step 1003, the UE includes the source base station failure information in the link failure report when initiating an RRC connection re-establishment procedure, for example, in an initialization phase thereof.

Embodiment 8

Figure 11:
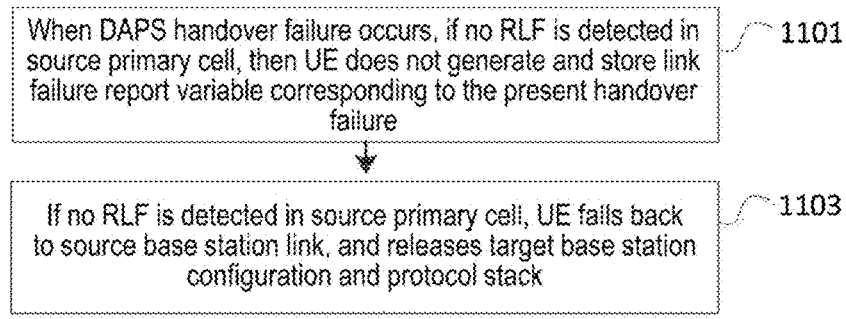
FIG. 11 is a flowchart showing a method performed by user equipment according to Embodiment 8 of the present invention.

FIG. 11 is a flowchart showing a method performed by user equipment according to Embodiment 8 of the present invention.

This embodiment is applicable to scenario 4. In this embodiment, when a DAPS handover failure occurs, if no RLF is detected on a source base station link of the UE, then the UE falls back to the source base station link. In this case, the UE does not generate a corresponding radio link failure report for the present DAPS handover failure event.

As shown in FIG. 11, in step 1101, when a DAPS handover failure occurs, that is, when T304 expires, if no RLF is detected in a source primary cell, then the UE does not generate and store a link failure report variable VarRLF-report corresponding to the present handover failure. In other words, only when an RLF is also detected in the source cell, does the UE generate and store the link failure report variable VarRLF-report corresponding to the present handover failure.

In step 1103, if no RLF is detected in the source primary cell, then the UE falls back to a source base station link, and releases a target base station configuration and protocol stack. The falling back to a source base station link includes falling back to an RRC configuration used by the source base station, and resuming a suspended signaling radio bearer of the source cell. The UE initiates transmission of a failure information message FailureInformation message to the source base station so as to fall back to the source base station link and inform the source base station that the DAPS handover failure has occurred.

The failure information message FailureInformation message includes one or a plurality of the following indication information: indication information for indicating that the failure is a DAPS handover failure; random access procedure information in the DAPS handover procedure; all available measurement results of one or more cells of which measured quality is the best, wherein the measurement does not include measurement of the source primary cell. Preferably, the one or more cells refer to cells associated with a configured measurement object (for example, configured by a measObjectNR information element).

Embodiment 9

Figure 12:
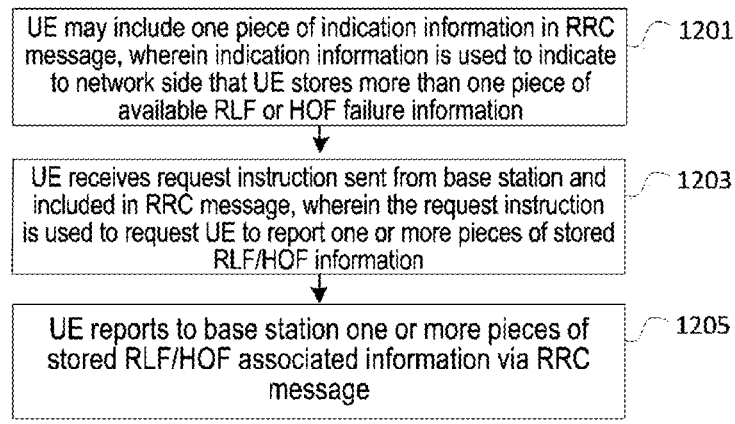
FIG. 12 is a flowchart showing a method performed by user equipment according to Embodiment 9 of the present invention.

FIG. 12 is a flowchart showing a method performed by user equipment according to Embodiment 9 of the present invention.

Provided in this embodiment is a method used by UE to report to a base station that the UE has more than one available radio link failure report thereon.

As shown in FIG. 12, in step 1201, if a link failure report variable (such as VarRLF-Report) on the UE stores more than one piece of available RLF or HOF failure information, the UE may include one piece of indication information in an RRC message. The indication information is used to indicate to a network side that the UE stores more than one piece of available RLF or HOF failure information. The RRC message may be an RRC setup complete message, an RRC resume complete message, an RRC re-establishment complete message, an RRC reconfiguration complete message, or the like. Preferably, when a registered public land mobile network (RPLMN) of the UE is included in a PLMN identity list stored in the link failure report variable, the UE performs the aforementioned operation.

In step 1203, the UE receives a request instruction sent from a base station and included in an RRC message. The request instruction is used to request the UE to report one or more pieces of stored RLF/HOF information. Preferably, the request instruction information may instruct the UE to report only one piece of RLF/HOF associated information, or may instruct the UE to report all stored RLF/HOF associated information. Preferably, the RRC message is a UE information request message UEInformationRequest.

In step 1205, the UE reports to the base station the one or more pieces of stored RLF/HOF associated information via an RRC message. Preferably, if the request instruction information is used to instruct the UE to report only one piece of RLF/HOF associated information in step 1203, then in step 1205, the UE reports only failure information associated with the most recent link failure. Alternatively, if the request is used to instruct the UE to report all of the stored RLF/HOF associated information in step 1203, then the UE reports all of the stored RLF/HOF associated information to the base station. Alternatively, the UE always reports all of the stored RLF/HOF associated information to the base station.

The aforementioned one piece of RLF/HOF associated information refers to failure information associated with one RLF or HOF event.

VARIANT EMBODIMENT

Figure 13:
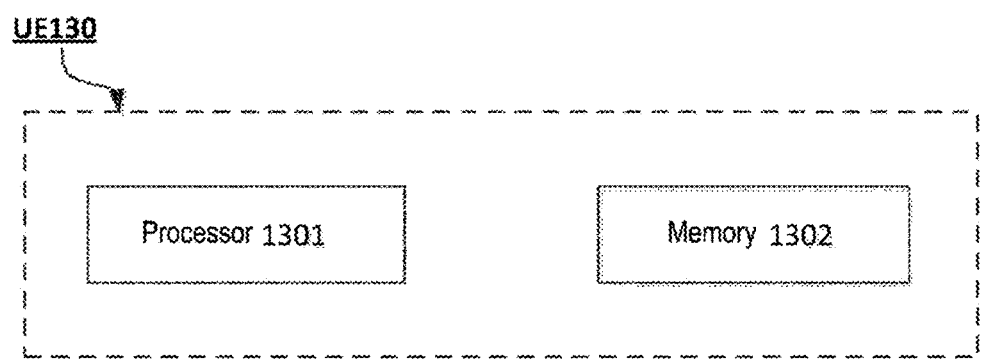
FIG. 13 is a block diagram schematically showing user equipment according to the present invention.

Hereinafter, FIG. 13 is used to illustrate user equipment that can perform the method performed by user equipment described in detail above in the present invention as a variant embodiment.

FIG. 13 is a block diagram showing user equipment (UE) according to the present invention.

As shown in FIG. 13, user equipment (UE) 130 includes a processor 1301 and a memory 1302. The processor 1301 may include, for example, a microprocessor, a microcontroller, an embedded processor, and the like. The memory 1302 may include, for example, a volatile memory (such as a random access memory (RAM)), a hard disk drive (HDD), a non-volatile memory (such as a flash memory), or other memories. The memory 1302 stores program instructions. The instructions, when run by the processor 1301, can perform the above method performed by user equipment as described in detail in the present invention.

It is to be noted that different embodiments are not mutually exclusive schemes. That is, different embodiments provide methods for different aspects of the problems described in the present invention, and may cooperatively work in a single system.

The method and related equipment according to the present invention have been described above in combination with preferred embodiments. It should be understood by those skilled in the art that the methods shown above are only exemplary. The method of the present invention is not limited to the steps or sequences illustrated above. The base station and user equipment shown above may include more modules. For example, the base station and user equipment may further include modules that may be developed or will be developed in the future to be applied to a base station, an MME, or UE. Various identifiers shown above are only exemplary, and are not meant to limit the present invention. The present invention is not limited to specific information elements serving as examples of these identifiers. A person skilled in the art could make various alterations and modifications according to the teachings of the illustrated embodiments.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A method performed by a user equipment, the method comprising:
    receiving a Radio Resource Control (RRC) message including a reconfigurationWithSync information element and one or more Data Radio Bearer (DRB) configurations to be configured with Dual Active Protocol Stack (DAPS) configuration, the RRC message being used to trigger a DAPS handover;
    performing the DAPS handover and starting a timer T304;
    detecting a radio link failure (RLF) in a source primary cell while the timer T304 is running; and
    upon expiry of the timer T304, storing handover failure information in an RLF report including:
    setting a first field to be an elapsed time between the reception of the RRC message and the RLF detected in the source primary cell while the timer T304 is running; and
    setting a second field to be a triggering cause for the RLF in the source primary cell.

2. A user equipment, comprising:
    a processor; and
    a memory storing instructions,
    wherein the processor runs the instructions to:
    receive a Radio Resource Control (RRC) message including a reconfigurationWithSync information element and one or more Data Radio Bearer (DRB) configurations to be configured with Dual Active Protocol Stack (DAPS) configuration, the RRC message being used to trigger a DAPS handover;
    perform the DAPS handover and start a timer T304;
    detect a radio link failure (RLF) in a source primary cell while the timer T304 is running; and
    upon expiry of the timer T304, store handover failure information in an RLF report including:
    setting a first field to be an elapsed time between the reception of the RRC message and the RLF detected in the source primary cell while the timer T304 is running; and
    setting a second field to be a triggering cause for the RLF in the source primary cell.

* * * * *